United States Patent
Crausaz et al.

(10) Patent No.: US 8,331,542 B2
(45) Date of Patent: Dec. 11, 2012

(54) PHONE URL EXCHANGE

(75) Inventors: Pascal R. Crausaz, San Jose, CA (US); Edwin J. Basart, Los Altos, CA (US); Dave Dix, San Francisco, CA (US); Thomas E. Miller, Mountain View, CA (US); Nam Do, Pleasanton, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 910 days.

(21) Appl. No.: 12/424,438

(22) Filed: Apr. 15, 2009

(65) Prior Publication Data

US 2010/0266111 A1 Oct. 21, 2010

(51) Int. Cl.
*H04M 11/00* (2006.01)

(52) U.S. Cl. ............... 379/93.29; 379/93.31; 379/93.28; 379/93.01

(58) Field of Classification Search ................ 379/93.01, 379/93.23, 93.25, 93.17, 90.01, 142.01, 142.07, 379/142.15, 142.17, 142.06, 88.17, 93.31, 379/93.28

See application file for complete search history.

(56) References Cited

U.S. PATENT DOCUMENTS

| | | | |
|---|---|---|---|
| 6,771,751 B1 | 8/2004 | Kasturi et al. | |
| 7,158,618 B1 * | 1/2007 | Kusuda et al. | 379/88.17 |
| 7,526,078 B2 | 4/2009 | Rodman et al. | |
| 2002/0042265 A1 * | 4/2002 | Kumaran et al. | 455/414 |
| 2002/0067812 A1 * | 6/2002 | Fellingham et al. | 379/93.25 |
| 2004/0045034 A1 * | 3/2004 | Moroo | 725/112 |
| 2005/0018687 A1 * | 1/2005 | Cutler | 370/395.2 |
| 2005/0212908 A1 | 9/2005 | Rodman et al. | |
| 2005/0213735 A1 | 9/2005 | Rodman et al. | |
| 2007/0041517 A1 * | 2/2007 | Clarke et al. | 379/67.1 |
| 2009/0157549 A1 * | 6/2009 | Symons | 705/44 |
| 2009/0210467 A1 * | 8/2009 | Iorio | 708/204 |

* cited by examiner

*Primary Examiner* — Melur Ramakrishnaiah
(74) *Attorney, Agent, or Firm* — Patent Law Works LLP

(57) ABSTRACT

A computer system (a method) for exchanging information such as a Universal Resource Locator (URL) or a Universal Resource Identifier (URI) over a communication channel in general and over a telephone communications channel in particular in a unified communications system is disclosed. In one embodiment, the system comprises a phone URL exchange unit configured to receive a phone URL exchange request from a first endpoint, to determine the URL to be sent and URL encoding method based on the request, to encode the URL into audio data or as a part of the communications control signals using the URL encoding method and to send the encoded data to a second endpoint over the telephone communications channel. The phone URL exchange unit is further configured to receive audio data or the communications control signals embedded with a URL and to decode the received data to reveal the URL.

38 Claims, 11 Drawing Sheets

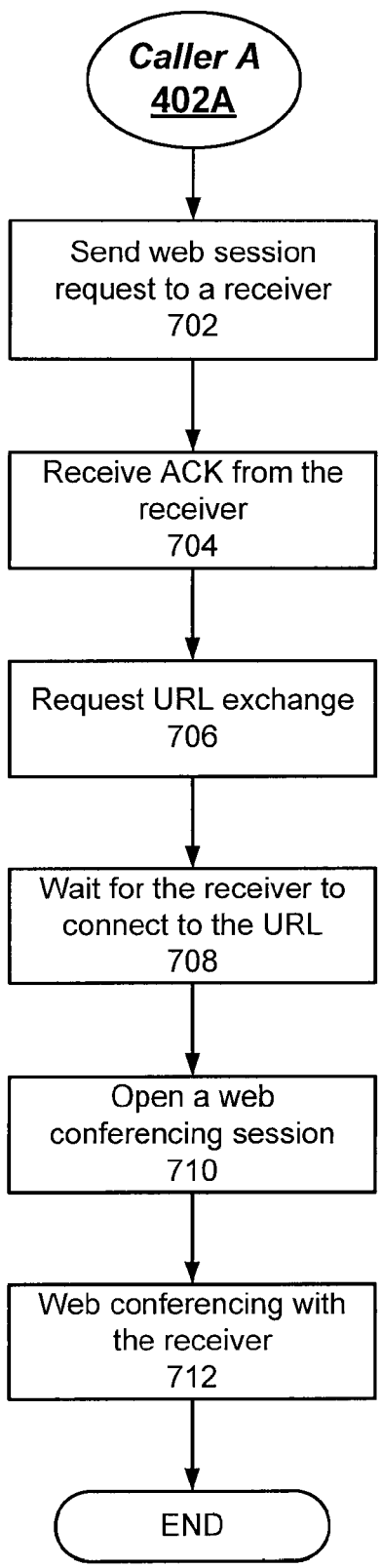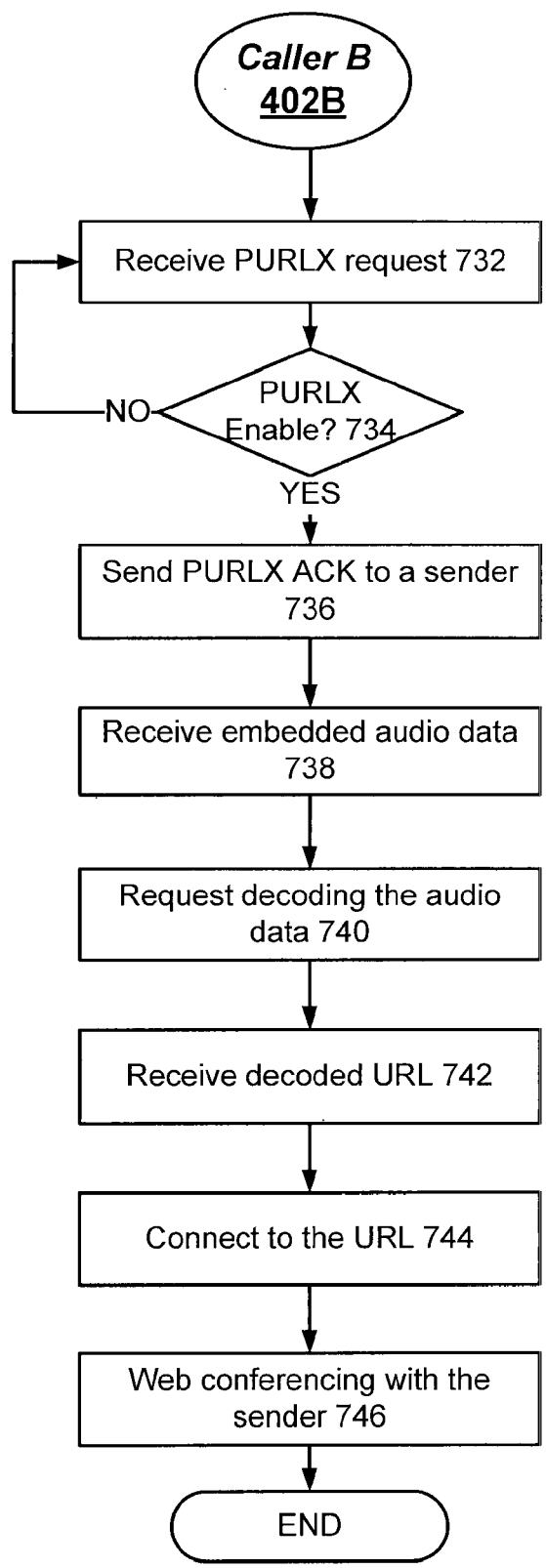
Figure 7A
Figure 7B

PHONE URL EXCHANGE

BACKGROUND OF THE INVENTION

1. Field of the Invention

The invention relates generally to information exchange in unified communications systems including telephony systems, electronic mail systems, voice mail systems, fax communications systems, Internet web-based systems, and other communications systems. Particularly, the invention relates to facilitating Universal Resources Locators (URLs) and Universal Resource Identifiers (URIs) exchange with an acceptable level of security between systems with or without a pre-defined relationship over a standard phone line.

2. Description of the Background Art

Unified communications systems integrates a variety of communications systems, such as instant messaging, chat, presence, telephony, data collaboration-including presentation sharing, desktop sharing, application sharing, whiteboard sharing, editable document sharing with audit trails, video, email, voicemail and short message services, such that users are able to exchange information in various formats in the unified communications systems. However, the exchange of information between two or more parties in a unified communications system relies on a control mechanism such as a federation and a clearing house, which implies a formal relationship between the two parties. Both federation and clearinghouse mechanisms result in inconvenient and inefficient set-ups for information exchange, which is not suitable for information exchange between a sender and a receiver that have no or little relationship. A telephony system, such as traditional switched telephone network systems or new telephony systems that use Voice over Internet Protocol (VoIP), can be used in conjunction with a system like the phone URL exchange (PURLX) system described in the invention to facilitate information exchange using an already established open line of communications between two un-related communications parties.

Web-based applications of a unified communications system, such as SharePoint™, Google applications, file sharing of Flickr, YouTube and social networking sites (e.g., Facebook™ or MySpace™) allow users to communicate with a shared organizer, which implies communications set-up and some forms of formal relationship. However, existing web-based communications are still cumbersome to exchange URLs or URIs between multiple parties. For example, a caller places a telephone call to another individual, listens as the other individual verbally provides an email address over the phone, and then sends an email message to the email address with the URL to be exchanged; or the caller and the other individual must be actively using the unified communication system. In yet another example, two parties uses cell phones and one party sends a short text message to the other party regarding the URL to be exchanged. A URI or a URL is used to identify or name a resource. A URL is a URI that, in addition to identifying a resource, provides means of acting upon or obtaining a representation of the resource by describing an access mechanism or network "location". From herein and throughout the specification, "URL" and "URI" are used interchangeably.

Traditionally, when dialing a telephone, a telephone number is encoded and transmitted across a telephone line as telephone tones, such as Dual-Tone Multi-Frequency (DTMF) tones. The tones "control" the telephone system by instructing where to route the call. These control tones are sent over the same telephone communications channel and in the same band as the voice and other sounds of the telephone call. One problem with DTMF is that the telephone tones are very loud and annoying to human senders and receivers. Further, when sending data that has low error tolerance, such as a URL transmitted using a modem, traditional DTMF signaling faces challenges to provide a secure and user friendly way to exchange URL over telephone communications channels.

As alluded to above, existing telephony systems in use today are not designed to exchange information for web-based applications, such as a URL for web conferencing, over telephone communications channels, especially in a secure and user friendly way. For example, one individual verbally provides a URL for a web conferencing session to a second individual using a telephone. Existing telephony systems do not have mechanisms to electronically exchange the URL even if sending and receiving apparatus (e.g., telephones) are able to receive such information with a URL encoding/decoding processing unit. The second individual must write down the URL or remember the URL and write it later or must be processed as in above examples, which is not convenient for telephone users to handle while simultaneously conducting a conversation.

Hence, there is a lack of a system and method that provides information exchange in general between unified communications systems with or without a pre-defined relationship over a communications channel. Particularly, there is a lack of a system and method that provides URL exchange using a telephony system between unified communications systems with or without a pre-defined relationship over a communications channel while providing an acceptable level of security.

SUMMARY OF THE INVENTION

The invention overcomes the deficiencies and limitations of the prior art by providing a system and method for exchanging information in general, and a Universal Resource Locator (URL) or a Universal Resource Identifier (URI) in particular, over a telephone communications channel in specific and over a communications channel in general. In one embodiment, the system comprises a first and a second endpoint corresponding to a first and a second caller (either of which can be a human being or an automated attendant), respectively. The system further comprises a phone URL exchange unit configured to receive a phone URL exchange request from the first endpoint, to determine the URL to be sent and URL encoding method based on the request, to encode the URL into audio data or as a part of the communications control signals using the URL encoding method and to send the audio data and the encoded URL to the second endpoint over the telephone communications channel. The phone URL exchange unit is further configured to receive audio data or the communications control signals embedded with a URL and to decode the received data to reveal the URL. The first and the second endpoint connect to the URL exchanged for general Internet based communications and especially for web-based communications. The invention also includes a variety of methods including a method for validating the sender and receiver of the phone URL exchange request against a whitelist and/or a blacklist and a method for decoding audio data or the communications control signals embedded with a URL.

BRIEF DESCRIPTION OF THE DRAWINGS

The invention is illustrated by way of example, and not by way of limitation in the figures of the accompanying drawings in which like reference numerals are used to refer to similar elements.

FIGS. 7A and 7B are flowcharts illustrating a process of two endpoints using a PURLX engine according to one embodiment of the invention.

DETAILED DESCRIPTION OF THE PREFERRED EMBODIMENTS

Figure 1:
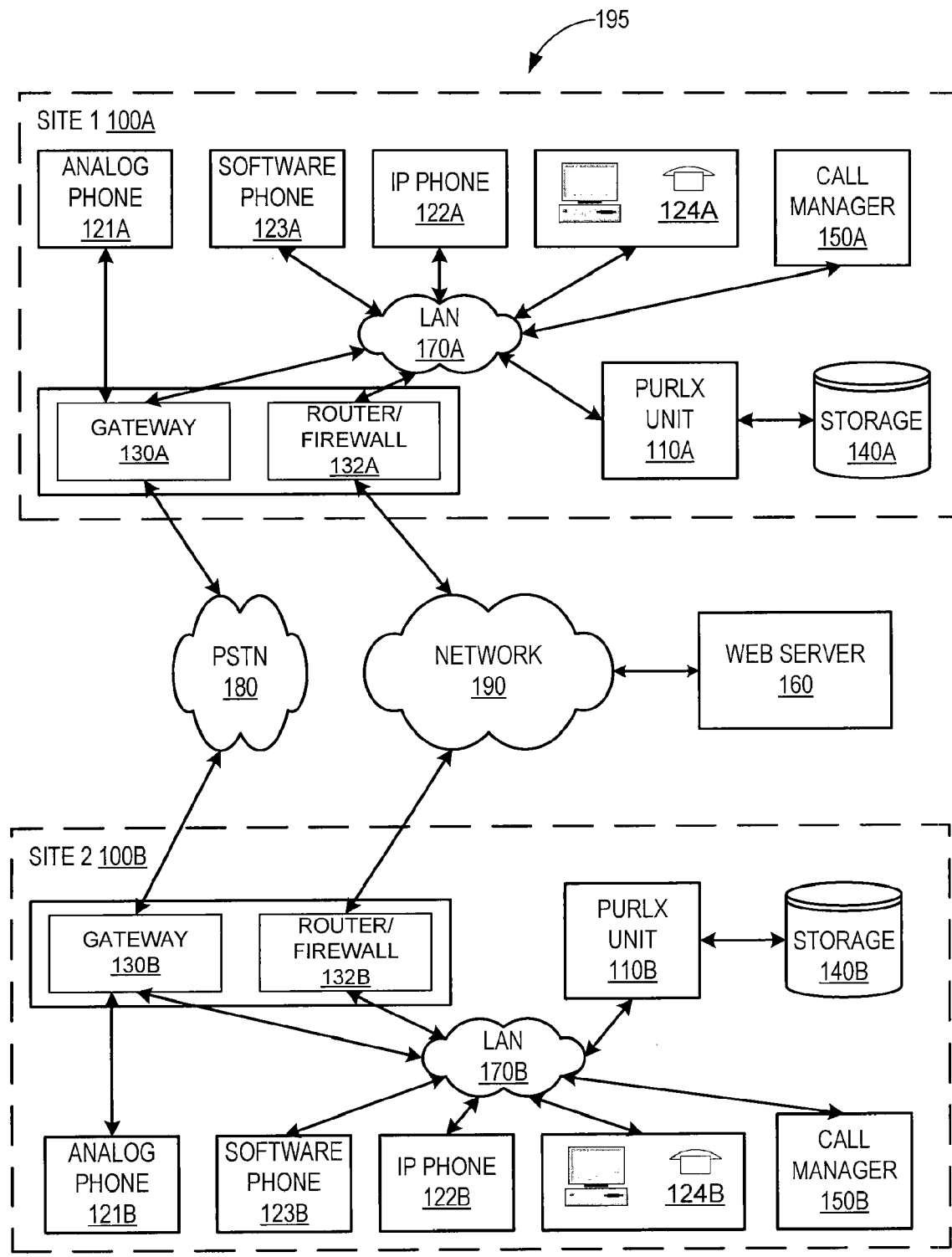
FIG. 1 is a high-level block diagram illustrating a functional view of a phone URL exchange system according to one embodiment of the invention.

A system and method for providing phone URL exchange capabilities for unified communications using a telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the invention is described in one embodiment below with reference to user interfaces and particular hardware. However, the invention applies to any type of computing device that can receive a data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, flash memory including Universal Serial Bus (USB) keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise unified communications systems and enterprise telephony systems have been developed. Enterprise unified communications systems integrates a variety of communications systems, such as instant messaging, telephony, data collaboration, video, email, voicemail, calendar and short message services, such that users are able to exchange information in various formats in the unified communications systems. Enterprise telephony systems, which comprise a set of voice gateways and servers, offer enterprise applications enabled by the integration of computer systems with telephony services. The software that supports the computer-integrated functionality is generally implemented as a client-server environment in which the participants or clients (distributed telephony users) communicate with a server.

FIG. 1 illustrates a high-level block diagram of a phone URL exchange system 195 according to one embodiment of the invention. The illustrated embodiment of system 195 includes a first site 100A and a second site 100B. As used herein, a site represents a grouping of computing resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 in FIG. 1 is used only by way of example. While FIG. 1 illustrates two sites, 100A and 100B, the invention applies to any system containing one or more related or unrelated sites. For example, the sites can belong to the same enterprise or belong to two related or unrelated enterprises without any relationship except telephone communications or voice over IP communications such as one using a Session Initiation Protocol (SIP).

The first site 100A includes a phone URL exchange (PURLX) unit 110A, a gateway 130A, a route 132A with a firewall, four endpoints (analog phone 121A, IP phone 122A, software phone 123A and smart phone-PC suite 124A), a device running a call manager application 150A, a local area network (LAN) 170A and a storage device 140A. The gateway 130A and the router 132A with the firewall may be combined in a single suite. The gateway 130A represents a VoIP device to which a number of telephony endpoints can be coupled, such as analog phones 121A, IP phones 122A, software phones (softphones) 123A and smart phone-PC suites 124A. Additionally, all the endpoints can be coupled to the call manager application 150A via the LAN 170A. In the illustrated embodiment, the gateway 130A is coupled to the LAN 170. The gateway 130A is also coupled to a public switched telephone network (PSTN) 180 via an analog or digital trunk line (e.g., a T1 or E1 interface). In the illustrated configuration, the gateway 130A provides an interface for calls originating from or terminating on the PSTN 180. The router/firewall 132A is configured to restrict an application at one site from communicating with another application at another site for network security concerns.

An endpoint enables a user to carry on a phone call. Although in the illustrated embodiment the first site 100A has four endpoints (one analog phone 121A, one IP phone 122A, one softphone 123A and one smart phone-PC suite 124A), in other embodiments the first site 100A has different numbers and types of endpoints. An endpoint is coupled (via the LAN 170A) to the call manager application 150A, the PURLX unit 110A, or both. Each of the endpoints can also include a display device (not shown) that is used in conjunction with the phone of the endpoint.

An endpoint has a user interface to send data, such as audio data and URLs, to a user and receive data from a user. In one embodiment, an endpoint further communicates with a PURLX unit 110A directly or through the gateway 130A and the call manager application 150A for URL exchange. This embodiment is further described with reference to FIGS. 3 and 5-7. In another embodiment, an endpoint comprises a phone URL exchange processing unit, a PURLX engine 262, within the endpoint itself. This embodiment is further described with reference to FIGS. 8-9. In yet another embodiment, an endpoint connects to a computer 404 having a PURLX engine 264 that implements phone URL exchange processing. The endpoint and the computer together perform the features or functions of the invention. This embodiment is further described with reference to FIGS. 10-11.

The analog phone 121A has, for example, a Telephone User Interface (TUI) that sends data through a speaker and receives data through a microphone and a keypad. The IP phone 122A has, for example, both a TUI and a graphical user interface that sends data through a display device associated with the IP phone 122A. In one embodiment, the IP phone's graphical user interface also receives data from a touch screen display device associated with the IP phone 122A. The softphone 123A has, for example, a software application that runs on a computer and sends data through a display device and a speaker and receives data through a microphone, a keyboard, and a pointing device. The smart phone-PC suite 124A comprises an IP phone and a computer such as a PC. The smart phone-PC suite 124A processes phone URL exchange in addition to audio data communicated through a speaker, microphone and a keypad. In one embodiment, the endpoints (e.g., the analog phone 121A, the IP phone 122A, the softphone 123A and the smart phone-PC suite 124A) collaborate with the call manager application 150A and the PURLX unit 110A to exchange URL data.

A device running a call manager application 150A, such as a computer, controls one or more endpoints with which it is associated. In one embodiment, the call manager application 150A is software or routines executable by a computer, or more specifically a processor. The call manager application 150A offers a user an interface through which he/she can perform call-related functions. Call manager application 150A can also trigger and specify URL data to be processed by the PURLX unit 110A and/or handle the decoded URL data generated by the PURLX unit 110A. While shown as operational as a separate module in this embodiment and FIG. 1, those skilled in the art will recognize that in other embodiments, the call manager application 150A may be operational as part of the gateway 130A or end points such as the IP phone 122A, the softphone 123A and the smart phone-PC suite 124A.

Although in the illustrated embodiment the first site 100A has only one call manager application 150, in other embodiments the first site 100A has a different number of call manager applications 150. A given endpoint is controlled by one call manager application 150. To communicate with an endpoint controlled by another call manager application 150, the call manager applications 150 communicate with each other. In one embodiment, two endpoints communicate with each other for the purpose of exchanging URLs over a communications channel.

The PURLX unit 110A is configured to implement features or functions of the invention. The PURLX unit 110A is coupled to the LAN 170A and can also be coupled to one or more endpoints, such as IP phone 122A and softphone 123A. In the embodiment illustrated in FIG. 1, one PURLX unit 110A is associated with each of the sites 100A-B. Other embodiments can have two or more PURLX units 110 in the site 100A or 100B. The PURLX unit 110 will be further discussed below with reference to FIGS. 2 and 3.

The storage device 140A contains directory information, including directory entries and associations between directories and phones. In one embodiment, the storage device 140A also contains information regarding the directory context of a phone. Alternatively, this information can be stored in the PURLX unit 110A. In one embodiment, directory context information includes one or more of the following: (1) a portion of a directory that is currently available for presentation (the portion could include, e.g., information from all entries versus information from entries that meet certain criteria); (2) a filter (if any) that was used to determine the entries in (1), such as a whitelist containing a list of phone numbers that are acceptable to exchange URLs via phone with others. Similarly, the filter may be used to determine a blacklist containing a list of phone numbers that are marked as unacceptable to exchange URLs via phone with others; (3) of the entries in (1), which entries are currently being presented by the phone; (4) of the entries in (3), which entry is currently navigated to; (5) what call function (if any) the directory was invoked during a voice communication. Note that since the directory context specifies the information presented by the phone, storing the directory context enables later determination of what information is being presented by the phone.

Also, note that directory context information need not include all items (1)-(5). For example, if the entire directory and the filter (2) are known, the directory portion available for presentation (1) can be determined. In the illustrated embodiment, the storage device 140A is directly coupled to the PURLX unit 110A.

One skilled in the art will appreciate that additional networking devices (not shown) can be added to the first site 100A, for example, if needed to support additional endpoints, PURLX units 110A or other systems. For example, the first site 100A can include a second gateway 130A and an edge router to couple the first site 100A to the network 190 and to provide local area connectivity for the first and second gateways 130A, 130B. One skilled in the art will also recognize that numerous configurations of gateways 130A, 130B and communications links are contemplated. For example, PSTN links can be coupled to multiple gateways 130 at several points within the topology and soft-gateways 130 can also be used.

For convenience and ease of understanding, the second site 100B is shown with the same structure and functionality as the first site 100A. Specifically, the second site 110B includes four endpoints (analog phone 121B, software phone 123B, IP phone 122B and smart phone-PC suite 124B), a PURLX unit 110B, a call manager application 150B, a storage 140B, a LAN 170B and a gateway 130B. Gateway 130B of the second site 100B is communicatively coupled with the PURLX unit 110B. Similar as gateway 130A, the gateway 130B provides an interface for calls originating from or terminating on the PSTN 180. A call can involve more than one gateway. For example, a call that originates from an endpoint that is communicatively coupled to gateway 130A at site 100A out to the PSTN 180 through gateway 130B from the PSTN 180 and terminates on an endpoint that is communicatively coupled to gateway 130B of the second site 100B involves two gateways: gateway 130A of the first site 100A and gateway 130B of the second site 100B. Those skilled in the art will recognize that the first site 100A and the second site 100B may have less or more components that these shown in the FIG. 1.

In one embodiment of the invention, the network 190 is a partially public or a globally public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the invention, the network 190 is an IP-based wide or metropolitan area network.

The system 195 of the invention also includes a web server 160 located at one of the sites 100A-B for communication with the PURLX unit 110 via the network 190. In another embodiment, the web server 160 is external to the system 195. The web server 160 can be a conventional web server, such as Apache Web Server. The web server 160 accepts data in a variety of formats and the data can be launched by a URL on a computer. For example, the web server 160 accepts HyperText Transfer Protocol (HTTP) requests from clients (e.g., endpoints) and serves the clients HTTP responses which usually are web pages located at the specified URL. Specifically, the web server 160 is communicatively coupled with the PURLX unit 110, the call manager application 150 or the gateway 130, and the web server 160 supports web-based communications associated with the URL exchanged over a telephone communications channel, such as web conferencing using the URL exchanged in conjunction with the use of any of the endpoints 121, 123, 122 or 124.

PURLX Engine 260

Figure 2:
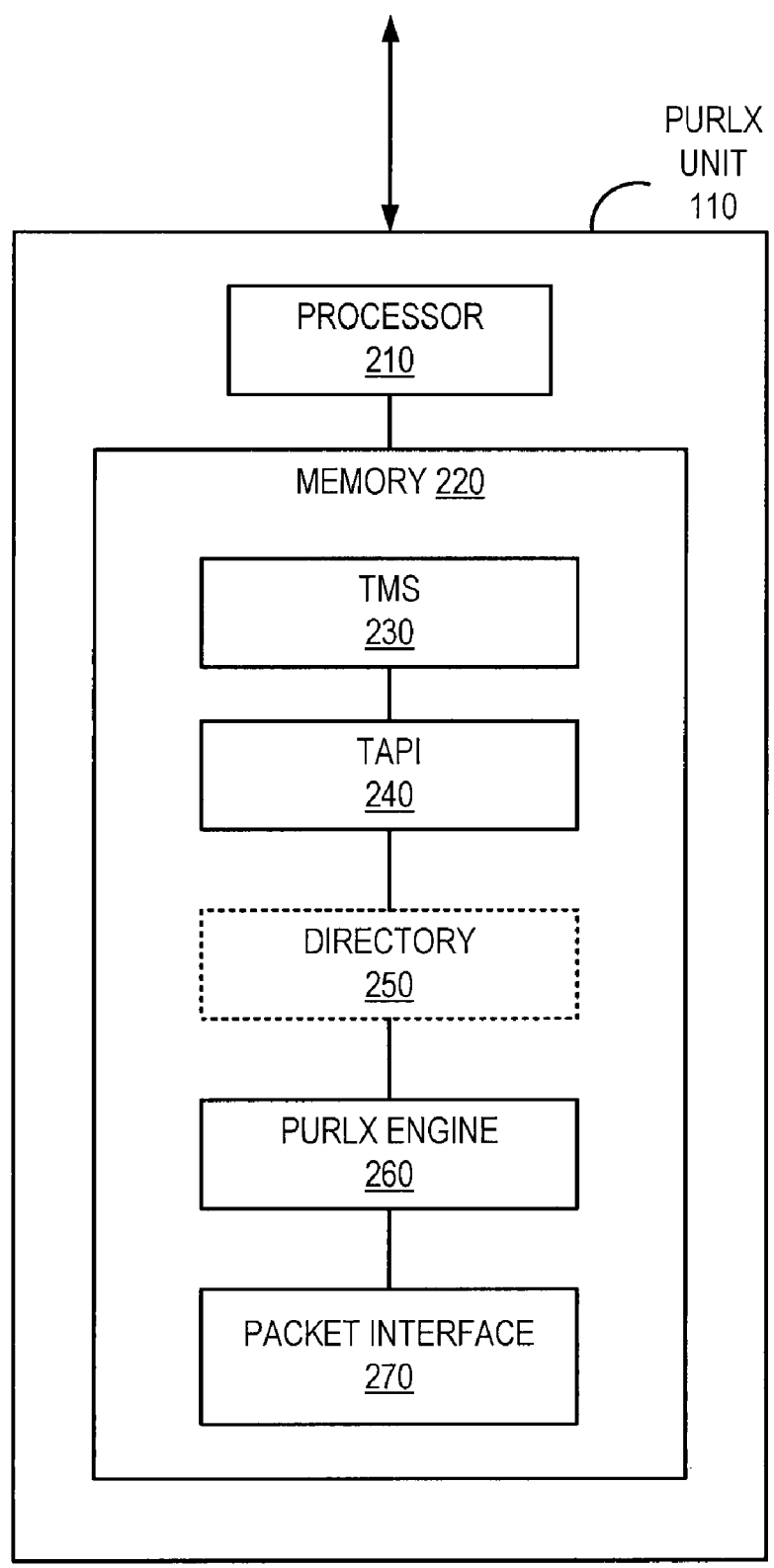
FIG. 2 is a block diagram illustrating a phone URL exchange (PURLX) unit on a server architecture according to one embodiment of the invention.
Figure 8:
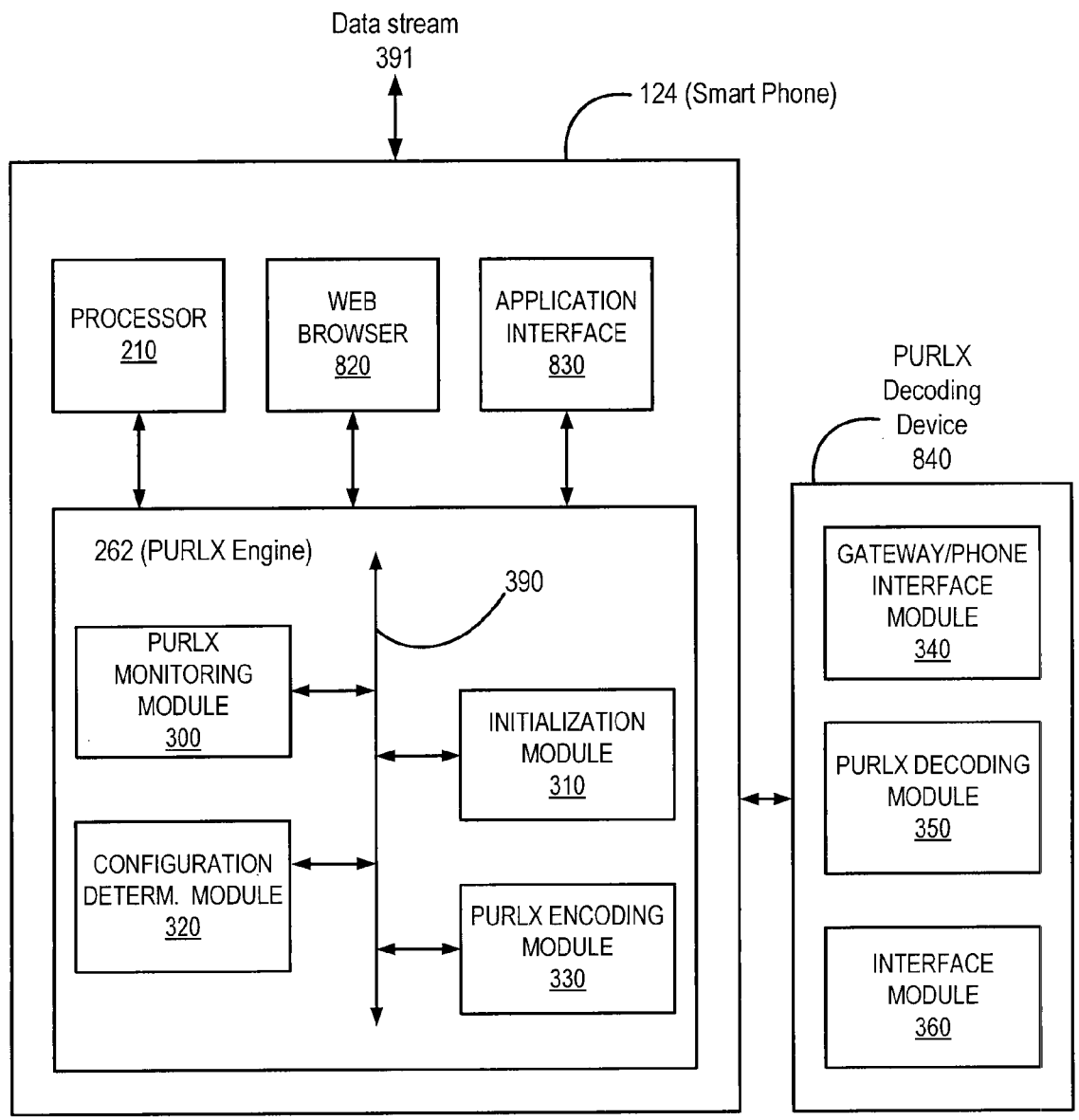
FIG. 8 is a functional block diagram showing an example of a smart phone having a PURLX engine according to one embodiment of the invention.

FIG. 2 shows an embodiment of the invention in which a PURLX engine 260 is part of the software operational on the PURLX unit 110. In another embodiment of the invention, the PURLX engine 260 is part of the software operational on the gateway 130. The PURLX unit 110 receives the URL to be used for transmission and embeds the URL into audio data or as a part of the communications control signals for communication over a telephone channel. In one embodiment, the use of the URL embedded in the audio data or in the communications control signals at a receiving end for launching web-based applications such as web conferencing sessions is delegated to a web browser either embedded in the receiving device or on a computer. Other embodiments may implement the functionalities of a PURLX engine 260 in a variety of functional units. For example, a phone URL exchange processing unit, a PURLX engine 262 in FIG. 8, is within an endpoint itself. For another example, an endpoint connects to a computer having a PURLX engine 264 in FIG. 10 that implements the phone URL exchange functionalities.

Referring now to FIG. 2, a block diagram of a PURLX unit 110 on a server architecture according to one embodiment of the invention is shown. In this embodiment, PURLX unit 110 is configured to implement features or functions of the invention. PURLX unit 110 includes a processor 210 and a memory 220. The processor 210 can be a conventional processing device, such as a general-purpose microprocessor. The memory 220 includes computer program instructions or functional units that implement features of the invention. Specifically, the memory 220 includes a telephony management software (TMS) unit 230, a telephony application programming interface (TAPI) unit 240, an optional directory unit 250, a PURLX engine 260 and a packet interface 270. TMS unit 230 provides an event and call control path to endpoints. TAPI unit 240 provides an application interface for the PURLX engine 260. The URLs sent or received by endpoints are transmitted to the TMS unit 230, the TAPI unit 240 and the PURLX engine 260.

In one embodiment, the memory 220 also includes one or more application units (not shown) or application interfaces (e.g., socket interface) that interact with the TMS unit 230 and the TAPI unit 240 to enable a specific computer-integrated function. An application unit uses the TAPI unit 240 to exchange data with the TMS unit 230. The TMS, or TAPI or any other mechanisms may be used to communicate with the processor 210 to indicate the inclusion of the URL to be embedded into audio data or as a part of the communications control signals. The memory 220 uses an application unit to inject the URL data into the audio data or the communications control signals or to signal the gateway 130 to include the URL data.

In the illustrated embodiment, the PURLX unit 110 includes an optional directory unit 250 in dashed lines. In general, the directory unit 250 enables a phone to access a directory and use the directory in conjunction with other phone functions. In one embodiment, directory unit 250 is implemented as a service that interacts with TMS unit 230. Communication or data exchange is between TMS unit 230 and directory unit 250. Although directory unit 250 is illustrated as executing on the PURLX unit 110, directory unit 250 can be distributed among computing devices as is known to one of skill in the art. For example, the functionality enabled by directory unit 250 can be implemented in a client-server fashion by having the client (user's local system, such as a general-purpose computer or endpoint) perform some functions and having the PURLX unit 110 perform others. As another example, some or all of the functionality enabled by directory unit 250 can be implemented by having a call manager application 150 perform some or all functions.

The PURLX unit 110 illustrated in FIG. 2 also includes the packet interface unit 270 that packs the received application data (e.g., URL and audio message data) into network packets according to the network protocols being used by the communications network (e.g., network 190). In one embodiment, the network protocol is Session Initiation Protocol (SIP) for setting update and tearing down multimedia communications sessions, such as voice and video calls over the Internet. Other embodiments use different network protocols such as Media Gateway Control Protocol (MGCP) for controlling mediate gateways on the Internet and PSTN, Remote Procedure Call, SIP, SOAP, H.323 and etc.

In the illustrated embodiment, the PURLX unit 110 includes the PURLX engine 260. The PURLX engine 260 is software or routines for exchanging a URL between two endpoints over a telephone communications channel. Specifically, the PURLX engine 260 encodes an URL and embeds the URL into audio data or as a part of the communications control signals. The PURLX engine 260 also decodes audio data or the communications control signals embedded with a URL. The PURLX engine 260 monitors calls between parties for a PURLX signal indicating that a first caller is requesting phone URL exchange with a second caller (i.e., a receiver of the call). The PURLX engine 260 then determines the URL encoding parameters including information to be sent and URL encoding method to be used. The PURLX engine 260 encodes the URL with the determined encoding method and embeds the URL into audio data or as a part of the communications control signals. The PURLX engine 260 may check a given user's rights or policies on receiving the embedded audio data or the communications control signals. The embedded audio data or the communications control signals are delivered by the telephony system to the receiver. Upon receiving audio data or the communications control signals embedded with a URL, the PURLX engine 260 decodes the embedded audio data or the communications control signals and delivers the decoded URL to its recipient such as an application module for further processing. The PURLX engine 260 is described in more detail below with reference to FIGS. 3 and 4.

Figure 3:
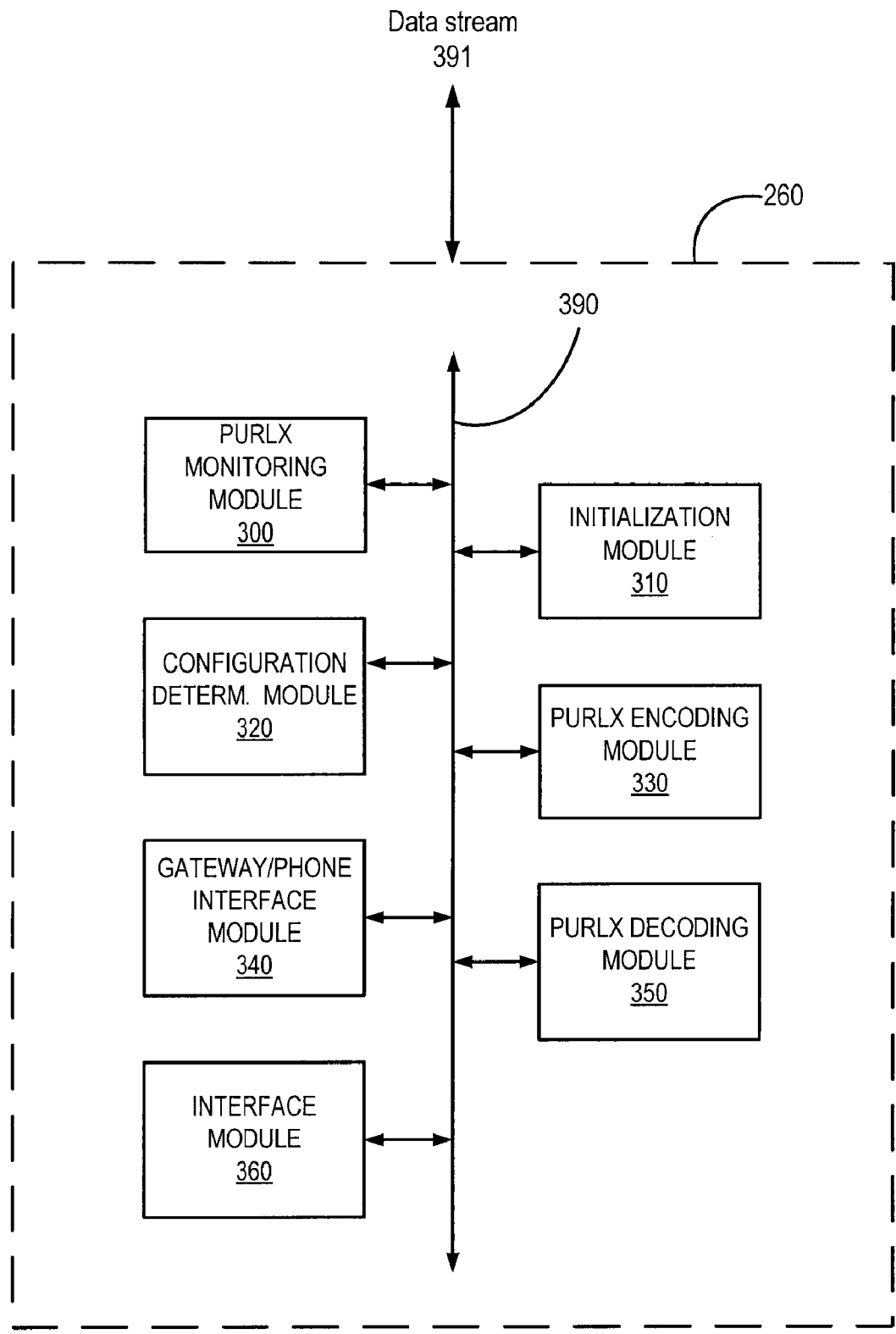
FIG. 3 is a block diagram illustrating a functional view of a PURLX engine according to one embodiment of the invention.

Referring now to FIG. 3, one embodiment of the PURLX engine 260 is shown. The PURLX engine 260 injects processed audio data embedded with a URL into a data stream (e.g., audio data) 391 to be sent over a telephone communications channel. The PURLX engine 260 also extracts embedded URL data from the data stream 391 received by the PURLX engine 260. The PURLX engine 260 comprises a PURLX monitoring module 300, an initialization module 310, a configuration determination module 320, a PURLX encoding module 330, a gateway/Phone interface module 340, a PURLX decoding module 350 and an interface module 360. These components cooperate together to provide the functionality of the invention. The operation of these modules 300, 310, 320, 330, 340, 350 and 360 can also be better understood with reference to FIGS. 4, 5, 9 and 11 below in addition to the description that follows.

The PURLX monitoring module 300 is software and routines for determining whether a caller has input a signal requesting phone URL exchange and signaling other modules (e.g., 310, 320, 330, 340, 350 and 360) of the PURLX engine 260 responsive to receiving a phone URL exchange request. In one embodiment, the PURLX monitoring module 300 interfaces with the call manager application 150 to determine whether any requests for phone URL exchange have been received from an application running on an endpoint or a computer. The PURLX monitoring module 300 is adapted for communication with the call manager application 150 or any application supporting the proper Application Programming Interface (API) being used by a signal line 390. The PURLX monitoring module 300 is advantageously able to identify when a request for phone URL exchange has been received, the parties on the call, a first party (a URL initiator) that has the URL to be exchanged, and one or more other parties (URL receivers) that receive the URL in an embedded audio data or in the communications control signals. The PURLX monitoring module 300 is also adapted for communication with the PURLX encoding module 330 to provide information about the URL to be exchanged.

The initialization module 310 is software and routines for initializing operation of the phone URL exchange functionality. The initialization module 310 is coupled by signal line 390 to the other modules 300, 320, 330, 340, 350 and 360 for initializing their operation. The initialization module 310 is also coupled to signal line 390 for communication with the call manager application 150 to enable specific endpoints so that they are able to utilize the phone URL exchange functionality. In one embodiment, initialization of different endpoints (e.g., an IP phone 122A and a softphone 124A) includes enabling an endpoint to use the phone URL exchange functionality, such as receiving a decoded URL, and notifying other modules responsible for launching a web browser and connecting to a web conferencing session located at the website indicated by the URL.

In one embodiment, the initialization module 310 also communicates with the directory 250 to validate the URL sender and receiver against a whitelist and/or blacklist stored in the directory 250 and/or a given user's rights or policies on receiving the embedded audio data or the communications control signals. For example, the initialization module 310 accepts a phone URL exchange request from a URL sender on the whitelist and rejects a phone URL exchange request from a URL sender on the blacklist. Similarly, the initialization module 310 may validate a URL receiver against the whitelist and/or blacklist. For example, the initialization module 310 delivers audio data or the communications control signals embedded with an URL to a URL receiver on the whitelist, and rejects the audio data or the communications control signals embedded with the URL to a URL receiver on the blacklist. Other embodiments implement the above validation in an application layer.

The gateway/phone interface module 340 is software and routines for determining the information to be sent over the telephone communications channels. In one embodiment, the information to be sent includes the URL requested by the sender, content of an audio message to the receiver, data sharing format such as text chat, white boards and audio-video conferencing and data to be shared (e.g., text, audio and video). The information to be sent in one embodiment is determined based on a pre-defined configuration. For example, the call manager application 150 is configured according to the pre-defined configuration to detect and retrieve the URL of a sender's conference (i.e., the URL identifying the sender's conference) on his/her associated gateway 130. In another embodiment, the information is determined on-the-fly, where the PURLX engine 260 asks the URL sender to identify the information to be sent. For example, upon detecting an input signal requesting phone URL exchange from a URL sender, the call manager application 150 is configured to prompt an inquiry on the caller's telephone user interface asking the sender to specify his/her conference by selecting the conference from a list or by entering it through an input means. In one embodiment, the URL data is input on a phone keypad as a series of characters including numbers running from 0 to 9 and alphanumeric characters running from [a-z] and [A-Z] as well as additional special characters. In another embodiment, on an IP phone, the sender can either select the conference from a list or enter it through a keypad.

The gateway/phone interface module 340 comprises software and routines for communicating with and controlling the gateway 130 or the IP phone 122. In one embodiment, the gateway/phone interface module 340 has two subsets of software and routines, one for communicating with and controlling the gateway 130 and the other for communicating with and controlling the IP phone 122. The gateway/phone interface module 340 may have an internal control to switch between the two sets of routines. The gateway/Phone interface module 340 is coupled by the signal line 390 to the gateway 130, IP phone 122 and the PURLX unit 110. The gateway/phone interface module 340 allows the PURLX engine 260, to communicate with the gateway 130 and/or the IP phone 122 to deliver audio data or the communications control signals embedded with a URL to its intended recipient, and reconnects and disconnects callers from one another.

Once the information to be sent being determined, the configuration determination module 320 further selects which URL encoding method to encode the URL and to embed the encoded URL into audio data or as a part of the communications control signals. An encoding method describes a methodology being used to encode a URL and a signaling scheme for the determined URL.

Various methodologies for encoding a URL can be used in the scope of the invention. For example, a URL may be encoded using an ASCII Binary encoding method. Using the ASCII Binary encoding method, a URL data is packetized and converted from one format, e.g., ASCII formatted data, to another format, e.g., Binary Coded Decimal (BCD) formatted data. If the call is a digital phone line, it is noted that not all binary values are valid, depending on the telephony coding scheme. This means that binary codes cannot be directly sent over a telephony line. For example, T-1 lines using channel associated signaling (CAS) utilize robbed bit signaling, which utilizes one of the 255 values in certain data bytes for control signals. The alphanumeric and special characters can be converted to ASCII as defined by the ASCII table from the ANSI committee. The encoded URL is then sent from the URL sender to its intended recipient over the telephone communications channel using a selected analog signaling scheme such DTMF or multi-frequency (MF) tones. DTMF is an intrusive signaling scheme used in telephone systems to converts numbers/characters found on standard telephone keypads to a particular frequency set, which can be converted back to the particular number. MF is similar to DTMF, but uses a different set of tones than those found on a telephone keypad.

In another embodiment, a URL may be encoded in a non-intrusive manner using steganography techniques. A steganography technique is a form of security through obscurity technique that data desirable to transport (i.e., to hide) is hidden in a carrier (i.e., signal, stream, or data file). A steganography technique enables the hidden data to be communicated in such a way that no one apart from the sender and the intended recipient realizes there is a hidden data in a data stream publicly transmitted over a communications channel. Electronic communications can include steganographic coding inside a transport layer, such as a file, or protocol, such as User Datagram Protocol (UDP). Media files (e.g., audio and video clips) are ideal for steganographic transmission because of their large size and/or the nature of a live audio stream. Taking UDP as an example, the URL to be exchanged is a part of the payload of a UDP packet. The steganography technique embeds the URL payload into a voice stream. The resulting signal/stream (e.g., a voice stream with embedded URL) is transmitted over a telephone communications channel. Care needs to be taken in the case of an analog telephone line, as converting a digital stream to analog and back to digital can introduce errors.

Other URL encoding and signaling algorithms are known to those of ordinary skills in the art, to whom the usage thereof within the context of the invention will be readily apparent, in the light of the specification. In one embodiment, a URL is encoded using modem signaling to be transmitted over a telephone communications channel. Similar to caller identification (Caller ID) service that transmits a caller's number to a called party's telephone equipment before the call is answered, during the quiet periods between ringing signals, or when the call is being set up but before the call is answered, the URL is encoded as a telephone number.

A related signaling technique is Caller ID while call waiting, which transmits a telephone number during a call, and the audio path to the listening parties is suppressed during transmission. A more general telephony technique than transmitting Caller ID numbers is Analog Display Signaling Interface (ADSI). ADSI is a combination of DTMF and Bell 202 modem signaling. The modem signaling supports the ASCII character set and allows longer strings than telephone numbers. The audio path is suppressed during transmission. The techniques to encode digital information (such as URL) into analog waveforms appropriate for an analog modem are readily known to those of ordinary skills in the art. The advantages of using modem signaling are higher data rate and a low error rate for encoding the URL onto an analog telephone line.

In another embodiment, a URL is encoded into an in-band signaling within a Real-Time Protocol (RTP) stream for VoIP calls between enterprises. In-band signaling is a mechanism to send metadata and control information in the same band, or on the same channel, as used for audio data. A RTP stream permits arbitrary binary data, however, the data is heard as sounds if played directly by the receiving phone. This can be overcome by encoding a tone to indicate that the stream should be muted, similar to Caller ID while call waiting and ADSI signaling. The signaling can be disguised using various coding methods, such as using steganography as described above. RTP streams have the option of encoding arbitrary digital data within the stream but not heard by the receiving phone, and are thus out of band. The Request for Comment (RFC) 2833 option for the RTP protocol describes how a packet header can indicate an arbitrary payload.

In yet another embodiment, a URL is encoded using Integrated Services Digital Network (ISDN) signaling. The ISDN D channel carries all signaling between a customer's terminal device and a carrier's end switching device. Using ISDN signaling, a URL is encoded as a part of the signaling transmitted over the D channel between the URL's endpoint and its associated switching which further transmits to the ISDN terminating equipment, where it is retrieved from the D channel and passed to the PURLX engine 260 and to its intended recipient.

Other URL encoding methods include Session Initiation Protocol (SIP) signaling and white noise signaling. SIP is a signaling protocol widely used for setting up and tearing down multimedia communications sessions such as voice and video calls over the Internet. A URL can be encoded as a part of SIP control signaling from a user agent on the transmitting user's telephony system to the user agent on the receiving user's telephony system and then passed to the PURLX engine 260. One skilled in the art will appreciate that individuals communicating with SIP softphones communicate using an embodiment of the invention independent of the PSTN network 180.

White noise is a random signal (or process) with a flat power spectral density. White noise exists at low levels in all telephony applications. Extra white noise is even added in cases where there is very little sound in order to give user the feeling that he/she is connected. This is called comfort noise generation. In one embodiment, the URL can be steganographically embedded in the low level white noise generated by the telephony system. The encoded URL is embedded into audio data and gets transmitted over a telephone communications channel. The recipient decodes the white noise and reconstructs the URL.

Referring back now to the PURLX encoding module 330, the PURLX encoding module 330 is software and routines for encoding a URL based on the encoding method selected by the configuration determination module 320. The PURLX encoding module 330 is coupled to signal line 390 for communication with the other modules this 300, 310, 320, 340, 350 and 360. Encoding a URL includes: receiving and processing a signal from the PURLX monitoring module 300 indicating a user has requested phone URL exchange, interacting with the configuration determination module 320 to determine the information to be sent and encoding method to use, encoding the URL into audio data or as a part of the communications control signals using the determined encoding method and controlling the gateway/phone interface module 340 to deliver the audio data or the communications control signals embedded with the URL to its intended recipient. The operation of the PURLX encoding module 330 is described in more detail below with reference to FIGS. 4-6.

The PURLX decoding module 350 is software and routines for decoding audio data or the communications control signals embedded with a URL. The PURLX decoding module 350 is coupled to signal line 390 for communication with the gateway/phone interface module 340. Decoding audio data or the communications control signals embedded with a URL includes: discovering the embedded audio data or the communications control signals on a receiving end (e.g., an IP phone 122), identifying the encoding method used in the embedded audio data or the communications control signals and decoding the embedded audio data or the communications control signals using a decoding method corresponding to the identified encoding method. For example, for an embedded audio data encoded using in-band signaling within a RTP stream, the PURLX decoding module 350 decodes the embedded audio data into an audio data payload and a decoded URL. Once decoded, the decoded data (e.g., audio data and URL) is sent to the gateway/phone interface module 340 for further processing, such as notifying a receiver of the received data, and waiting for a confirmation from the receiver. The interface module 360 notifies a web server associated with the receiver and the web server waits for the receiver to connect to the received URL.

The interface module 360 is software and routines for interfacing with other components of the phone URL exchange system 195, and these components are communicatively coupled to the PURLX engine 260. The interface module 360 is coupled to the signal line 390 for communication with the other components such as the call manager application 150 and the IP phone 122. The interface module 360 initiates the send of a URL embedded in audio data or as a part of the communications control signals to its recipients. The interface module 360 also communicates with the call manager application 150 to handle the URL, and the call manager application 150, in turn, invokes a web browser to render the URL into its corresponding HTML files and communicates the rendered URL with the web server 160.

Figure 4:
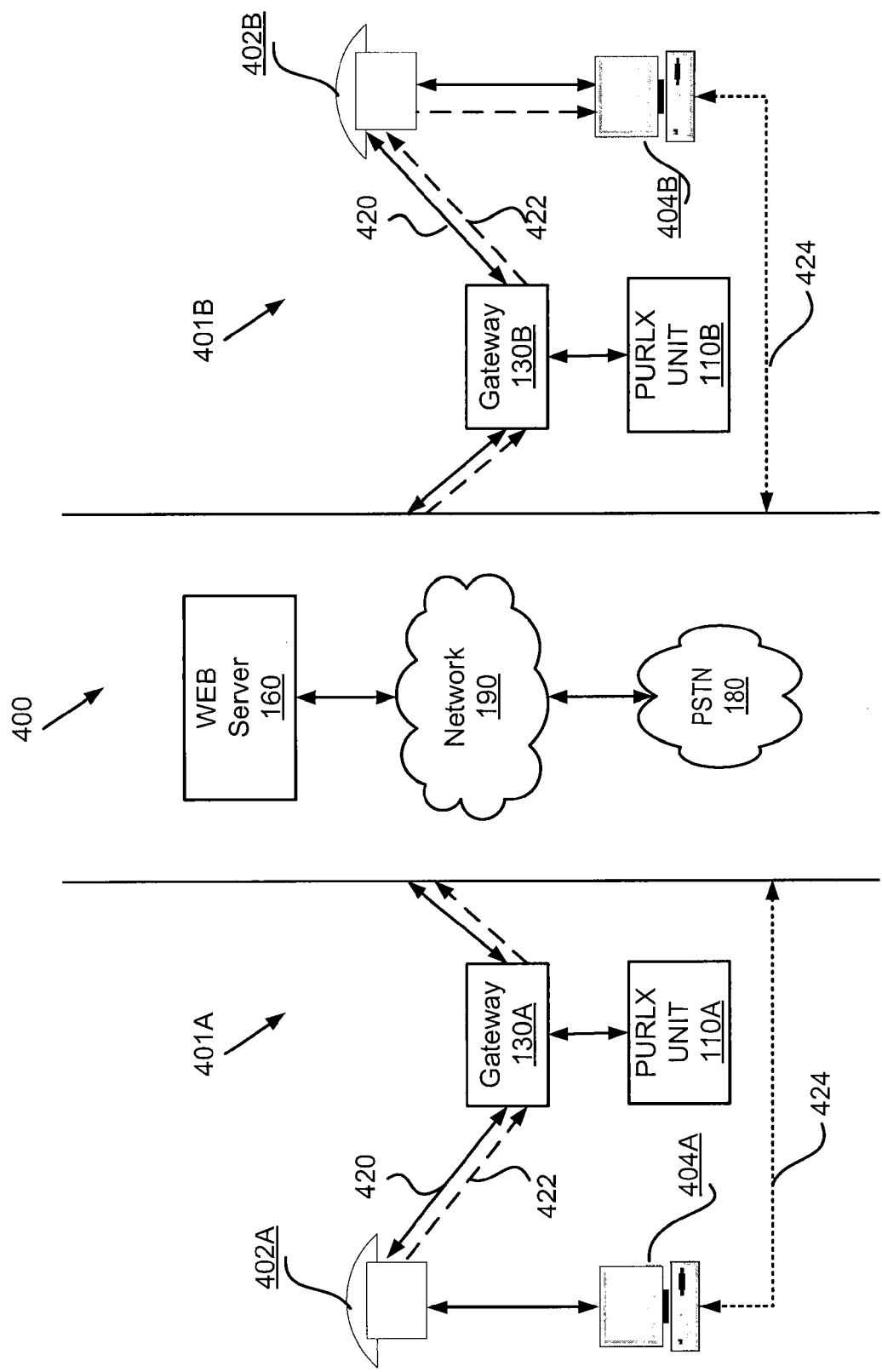
FIG. 4 is an example of a distributed telephony system utilizing the invention according to one embodiment of the invention.

Referring now to FIG. 4, an example of a telephony system 400 utilizing the invention is shown according to one embodiment of the invention. In particular, FIG. 4 shows a diagram illustrating an example with a first caller communicating with a second caller and how the invention exchanges a URL between the callers over a telephone communications channel. As shown in FIG. 4, the first caller has a system 401A that includes an endpoint 402A (e.g., an IP phone 122) and a computer 404A for communicating audio data with the second caller. The system 401A of the first caller is communicatively coupled with a gateway 130A and a PURLX unit 110A. Similarly, the second caller has a system 401B that includes an endpoint 402B and a computer 404B for communicating audio data with the first caller. The system 401B of the second caller is communicatively coupled with a gateway 130B and a PURLX unit 110B. These system 401A and 401B configurations are provided only by way of example, and those skilled in the art will recognize that there are a variety of other configurations for the systems of the first caller and second caller. To simplify description of an embodiment, the first caller is also referred to as 402A and second caller is referred to as 402B.

Initially, a call is established between the first caller 402A and the second caller 402B. This call could be audio only or audio embedded with a URL. The call could be an audio message requesting a web conferencing session from the first caller to the second caller. The audio data of the call along with the signaling of the call (e.g., PSTN signaling, or SIP signaling) is represented by solid line 420, the embedded URL is represented by the dashed line 422, and the web data corresponding to the embedded URL data 422 is represented by the dashed line 424. Once the second caller 402B confirms to join the web conferencing session, the first caller 402A presses a special key on his/her keypad, or a button in the application or a key on the keyboard of the computer to signal a phone URL exchange request. In one embodiment, the system 401A communicates with the PURLX unit 110A to validate the URL initiator (i.e., the first caller) and the URL receiver (i.e., the second caller). In another embodiment, the URL initiator and receiver validation is optional. The PURLX unit 110A further determines the information to be sent and URL encoding method. For example, the PURLX unit 110A determines the URL of the first caller's conference for a web conferencing session and audio message to embed the URL based on a pre-defined configuration. The PURLX unit 110A encodes the URL using the determined method (e.g., steganography in a voice stream) and embeds the encoded URL (represented by the dashed line 422) into one of the audio messages sent by the first caller. The first caller 402A communicates with the second caller 402b via the gateways 130A-B, the PSTN 180 and the network 190 in one or more audio messages. The encoded URL 422 embedded with the audio data of the call along with the signaling of the calls 420 is delivered from the first caller 402A to the second caller 402B (e.g., the arrowed path of 422 URL data from the first caller 402A to the second caller 402B). The web data 424 corresponding to the embedded URL data 420 are communicated between the first caller 402A and 402B. The interface module 360 of the PURLX unit 110 determines whether the same URL is to be used or a variation of the URL to be used by the URL sender and the receiver. For example, the URL sender may uses a variation of the embedded URL as "http://server/meeting/leader/123" and the receiver uses another variation of the same embedded URL as "http://server/meeting/participant/123". Once the embedded audio data being delivered to the second caller 402B, or in parallel to the embedded audio data being delivered to the second caller 402B, the first caller 402A launches a web browser and a web conferencing session using the URL exchanged through the web server 160.

On the receiving end of the audio data embedded with the URL, e.g., the second caller 402B, the PURLX unit 110B detects the embedded audio data by the gateway 130B in one embodiment, or by the computer 404B in another embodiment. The second caller 402B communicates with the PURLX unit 110B to decode the embedded audio data. The second caller 402B receives the decoded URL, launches a web browser from the computer 404B and connects to the web conferencing session at the received URL ending on the web server 160.

In another embodiment, a caller may call an automated attendant (i.e., non-human receiver on the other end of a call). The caller may be presented with an option to receive a URL from which the caller can get further information from the web page located at the URL or to provide information in a web form associated with the URL.

To further illustrate the example in FIG. 4, a real world scenario using the invention is presented. A typical scenario may be as follows: Alice works for company A which uses some of product development tools of company B. Both companies use a telephony system that has implemented the phone URL exchange functionality according one embodiment of the invention. Other than the PURLX telephony system, the two companies have no prior information exchange experience with each other. Alice calls Bob, a technical support at company B, for some technical problems she has encountered during her product development. Bob asks Alice if she would mind performing a web conferencing session on her system so that Bob can actually see some specific configuration screens of the product development. Alice agrees.

At this point, Bob presses a special key on his IP phone. The URL for Bob's conference on his collaboration bridge is retrieved by the system. The URL is encoded into an audio message according to the encoding method determined by the system and sent on the telephone line. Alice hears a message like "Your correspondent is starting a collaboration session. Please wait for the communication to complete." After a few seconds, Alice's call manager pops up an alert: "Your correspondent is requesting to launch your web browser. Do you want to open it now? Launch/Cancel?" Alice clicks on "Launch." A web browser pops up and she connects to the web conferencing session where Bob is waiting for her.

Those skilled in the art will recognize that the example of FIG. 4 represents the simplest of cases, and that the invention includes a variety of alternate embodiments. Alternate embodiments of the invention are described in more detail below with reference to FIG. 8-11.

Allowing phone URL exchange between a human user and an automated attendant has a wide range of applications such as customer services and advertising business. Using the Alice-Bob example described above for the embodiment of phone URL exchange between a human user (e.g., Alice) and an automated attendant of a company called ACME, Alice has a PURLX unit and a smart phone (or a phone and a computer). She connects to ACME's phone system to get support information on a microwave she purchased. Alice is sent to a phone queue by an automated attendant on ACME end. While Alice waits, she can either be prompted to receive information (e.g., a URL) or have the information sent to her directly using the PURLX mechanism described above. Alice's PURLX unit decodes the information and sends the decoded information to the application layer which prompts Alice to open the web browser at the URL provided. Depending on which number Alice called, or which selection she made with the automated attendant, Alice can have different types of information. For example, the information is a URL which points to a frequently-asked-questions (FAQ) web page for her microwave. In some cases the URL provides a form in which Alice may submit additional information via the web to assist ACME in meeting her needs, such as her current address and the best time for a service call.

Another application of phone URL exchange between a human user and an automated attendant is advertising business. Similar to pop-up advertisement commonly seen in a user's computer while the user browses the web. The PURLX system described above provides a framework for a similar method of advertisement via a telephone. The advertising provided by the PURL system is less intrusive than a standard sale call since all the information (e.g., URL) is out-of-band. In the example above, Alice calls ACME and the ACME system may push to Alice via the PURLX system new product information and advertisements about her microwave and ACME's new microwave product line. In a similar embodiment of the invention, the automated attendant performs more advanced operations such as identifying the caller using a caller ID mechanism, authenticating the caller with a pin or a password, and performing actions—such as transferring or emailing of files from the caller office computer to a specific or pre-defined email account.

Methods

Figure 5:
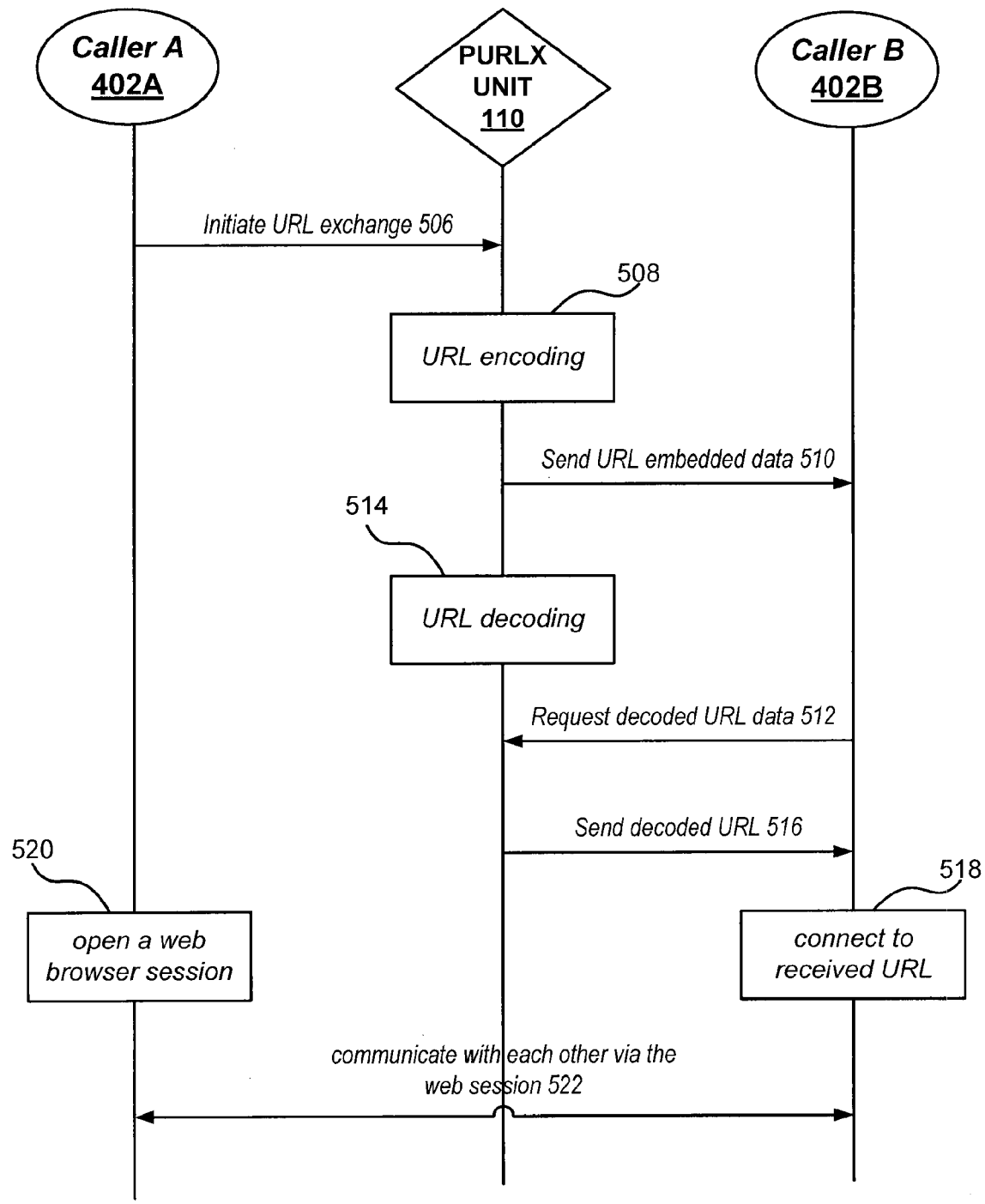
FIG. 5 is a flow chart illustrating an example of a process for phone URL exchange using a PURLX engine according to one embodiment of the invention.

Referring now to FIGS. 5-6 and 7A-B, methods for performing a phone URL exchange are shown. FIG. 5 is a flow chart illustrating an example of phone URL exchange using the PURLX engine 260 according to one embodiment of the invention. For purposes of simplicity, only one PURLX unit 110 is illustrated in FIG. 5. The PURLX unit 110 should be interpreted as the PURLX unit 110A responsive to operations associated with caller 402A. The PURLX unit 110 should be interpreted as the PURLX unit 110B responsive to operations associated with caller 402B.

Initially, a first caller 402A initiates 506 phone URL exchange by sending a phone URL exchange signal to the PURLX unit 110. The PURLX unit 110 determines the information to be sent and URL encoding method and encodes 508 the URL into audio data or as a part of the communications control signals. The PURLX unit 110 sends 510 the audio data or the communications control signals embedded with the URL to a second caller 402B. The PURLX unit 110 decodes 514 the URL embedded in the audio data or in the communications control signals, and the second caller 402B sends 512 a request to the PURLX unit 110 for the decoded URL data. The PURLX unit 110 sends 516 the decoded URL to the second caller 402B. The first caller opens 520 a web conferencing session at the URL exchanged, and the second caller connects 518 to the received URL to join the web conferencing session. The first caller 402A and the second caller 402B communicate 522 with each other via the web conferencing session at the exchanged URL.

Figure 6:
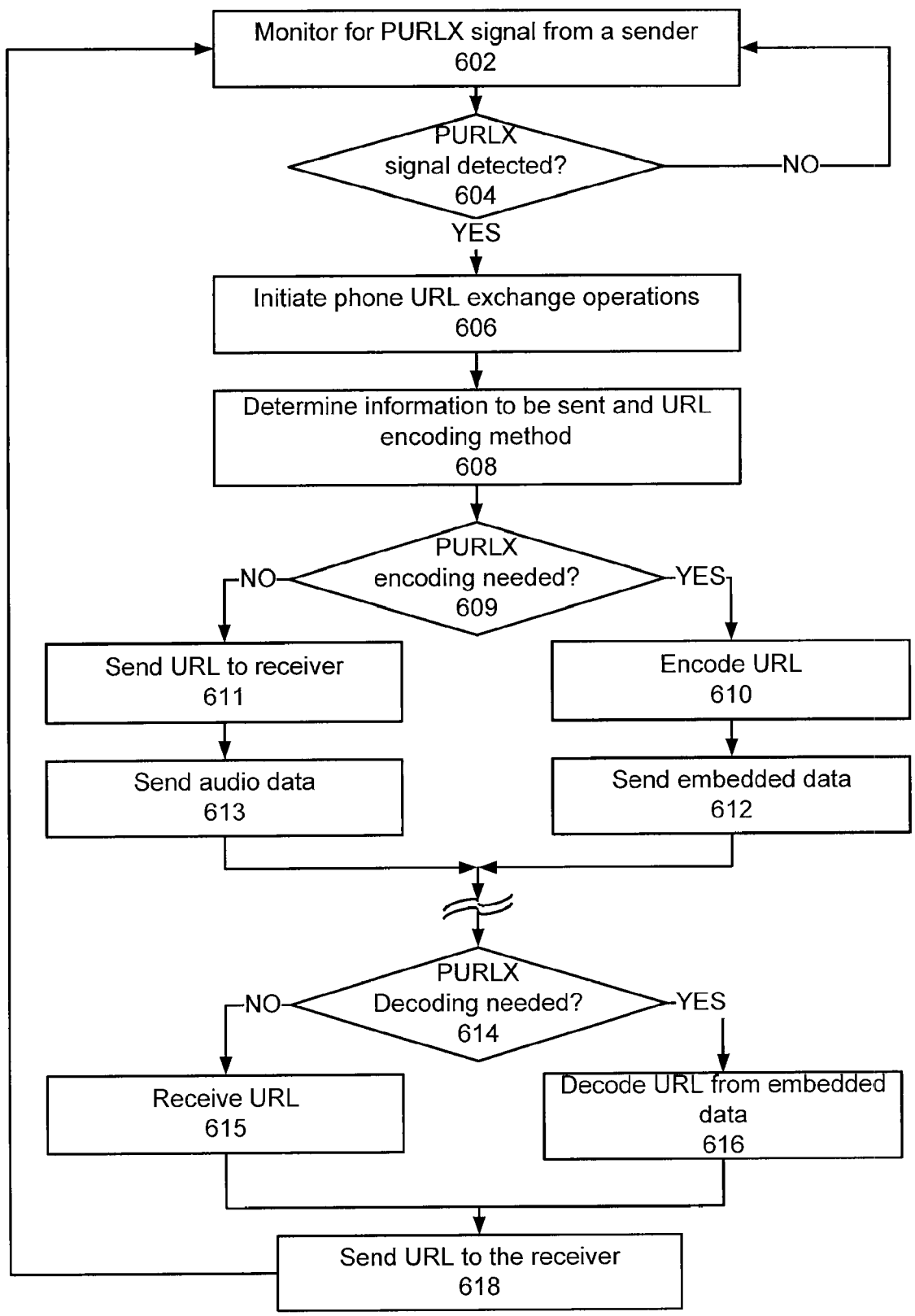
FIG. 6 is a flowchart illustrating a process performed by a PURLX engine according to one embodiment of the invention.

FIG. 6 is a flowchart illustrating a process performed by the PURLX engine 260 according to one embodiment of the invention. In particular, FIG. 6 shows a general method performed when one PURLX unit 110 performs both the encoding and decoding functions similar to the process described above with reference to FIG. 5. The method begins by monitoring 602 for a PURLX signal from a sender by the PURLX monitoring module 300 of the PURLX engine 260. Responsive to no PURLX signal being detected, the PURLX engine 260 loops back to step 602 to continue to monitor for the PURLX signal from a sender. Responsive to a PURLX signal being detected 604, the PURLX engine 260 initiates 606 the phone URL exchange operation by the initialization module 310. The PURLX engine 260 determines 608 the information to be sent and URL encoding method using the configuration determination module 320. Next, the method determines 609 whether PURLX encoding is needed. If so, the PURLX engine 260 encodes 610 the URL to be exchanged by the PURLX encoding module 330 and sends 612 the embedded audio data or communications control signals to its intended recipient. If PURLX encoding is not needed, the PURLX engine 260 sends 611 the URL to the receiver, for example out of channel, and then sends 613 the audio data, for example, in channel.

Responsive to the recipient receiving audio data or the communications control signals, whether encoded or not, the method determines 614 whether decoding is needed. For example, this may be in response to a PURLX decoding request received from a receiver of the embedded audio data. If the PURLX engine 260 determines that decoding is needed, the PURLX engine 260 decodes 616 the embedded audio data by using the PURLX decoding module 350 and sends 618 the URL to the receiver through the gateway interface module 340 of the PURLX engine 260. If no PURLX decoding is needed, the PURLX engine 260 receives 615 the URL from the sender and sends 618 the URL to the receiver through the gateway interface module 340 of the PURLX engine 260. Once the URL has been sent to the receiver, the PURLX engine 260 continues monitoring for next PURLX signal from a sender and returns to step 602.

FIGS. 7A-7B are flowcharts illustrating methods performed by two endpoints using the PURLX engine 260 according to one embodiment of the invention. FIG. 7A is a flowchart of a phone URL sender using the PURLX engine 260 according to one embodiment of the invention. Initially, a phone URL sender (e.g., caller 402A) sends 702 a web session request to a receiver over a phone line. The caller 402A receives 704 an acknowledgement from the receiver. The caller 402A requests 706 a phone URL exchange by pressing a special key on his/her keypad. The caller 402A waits 708 for the PURLX engine 260 to encode the URL and the receiver to connect to the URL exchanged. Upon the receiver connecting to the URL exchanged, the caller 402A opens 710 a web conferencing session at the URL exchanged and communicates 712 with the URL receiver.

FIG. 7B is a flowchart of a phone URL receiver (i.e., a phone URL callee) using the PURLX engine 260 according to one embodiment of the invention. Initially, the phone URL callee (e.g., caller 402B) receives 732 a phone URL exchange request from a sender (e.g., caller 402A). Caller 402B optionally checks 734 whether his/her phone is phone URL exchange capable. Responsive to the phone not capable of exchanging URLs over a telephone line ("NO"), caller 402B cancels the request, notifies the requestor application, and does not join the web session and returns to step 732 for next phone URL request. Responsive to the phone capable of exchanging URLs over a telephone line ("YES"), caller 402B sends 736 a PURLX acknowledgement to a phone URL request sender. The type of data being sent in the PURLX acknowledgement is associated with the PURLX request to guarantee the phone URL exchange flexibility. The type of data being sent in the PURLX acknowledgement, in one embodiment, is web session data. The caller 402B receives 738 an embedded audio data and sends a request 740 to the PURLX engine 260 for decoding the embedded audio data. The caller 402B receives 742 the decoded URL from the PURLX engine 260 and connects 744 to the received URL. The caller 402B communicates 746 with the phone URL sender (i.e., caller 402A) via the web conferencing session at the received URL.

Referring now to FIG. 8, FIG. 8 is a functional block diagram showing an example of a smart phone 124 having a PURLX engine 262 according to one embodiment of the invention. The smart phone 124 comprises a processor 210, a web browser 820, an application interface 830 and an embodiment of the PURLX engine 262. The smart phone 124 sends and receives a plurality of data streams 391 though the application interface 830. The smart phone 124 communicates with a PURLX decoding device 840. The processor 210 can be a conventional processing device, such as a general-purpose microprocessor. The web browser 820 can be a conventional web browsing application. The application interface 830 triggers the sending URL embedded in audio data or communications control signals, and passes the received data stream 391 to the PURLX engine 262 for further processing. The application interface 830 also uses the web browser 820 to open the URL decoded by the PURLX engine 262.

The PURLX engine 262 in FIG. 8 comprises a PURLX monitoring module 300, an initialization module 310, a configuration determination module 320, and a PURLX encoding module 330. Comparing with the PURLX engine 260 of the PURLX unit 110 described in conjunction with FIG. 2 and FIG. 3, the embodiment of the PURLX engine 262 illustrated in FIG. 8 has three components (i.e., gateway/phone interface module 340, PURLX decoding module 350 and interface module 360) distributed to the PURLX decoding device 840 communicatively coupled to the smart phone 124. These modules/components cooperate together to provide the same functionality of the invention as that described above with reference to FIGS. 3-4. Having the PURLX engine 262 inside the smart phone 124 enables the smart phone 124 to detect a phone URL exchange signal, to initiate the phone URL exchange operations, to determine information to be sent and URL encoding method and to encode the URL to be exchanged. Upon receiving an embedded audio data or the communications control signals, the smart phone 124 is also able to communicate with the PURLX decoding device 840 that decodes the embedded audio data or the communications control signals, communicate with a web server, launch a web browser and connect to the decoded URL for web-based communications with the URL sender. In another embodiment, the smart phone 124 can have a PURLX engine 262 that is same as the PURLX engine 260 in FIG. 3 that includes the modules 300, 310, 320, 330, 340, 350, and 360. The operation of these modules 300, 310, 320, 330, 340, 350 and 360 can also be better understood with reference to FIGS. 3 and 4 above.

Figure 9:
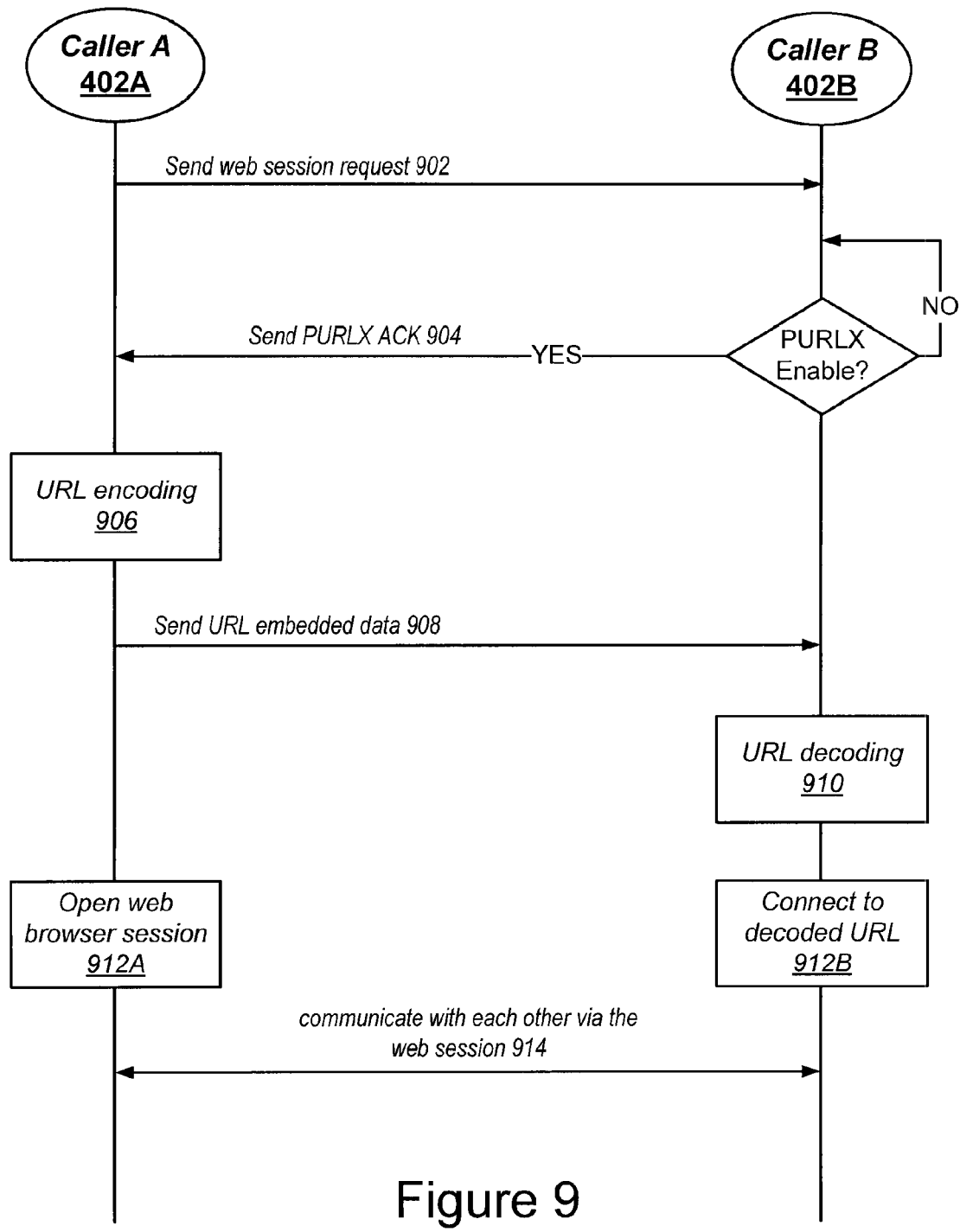
FIG. 9 is a flow chart illustrating an example of phone URL exchange using the PURLX engine illustrated in FIG. 8 according to one embodiment of the invention.

FIG. 9 is a flow chart illustrating an example of phone URL exchange using the PURLX engine 262 illustrated in FIG. 8 according to one embodiment of the invention. Initially, caller 402A uses his/her smart phone 124 to send 902 a web session request to caller 402B. Caller 402B checks whether his/her phone is capable of exchanging URLs over a telephone line. Responsive to his/her phone incapable of phone URL exchange, caller 402B does not join the web session. Responsive to his/her phone capable of phone URL exchange, caller 402B uses his/her smart phone 124 to send back 904 a PURLX acknowledgement to caller 402A. Caller 402A uses his/her smart phone 124 to determine the URL to be exchanged and URL encoding method and encode 906 the URL into audio data or as a part of the communications control signals. Caller 402A sends 908 the embedded audio data or the communications control signals to caller 402B. Upon receiving the embedded audio data or the communications control signals, caller 402B uses his/her smart phone 124 to decode 910 the embedded audio data or the communications control signals and connect 912B to the decoded URL for web-based communications with caller 902A. Caller 402A also opens 912A a web browser session at the URL exchanged. Caller 402A and caller 402B communicate 914 with each via the web browser session at the URL exchanged.

Figure 10:
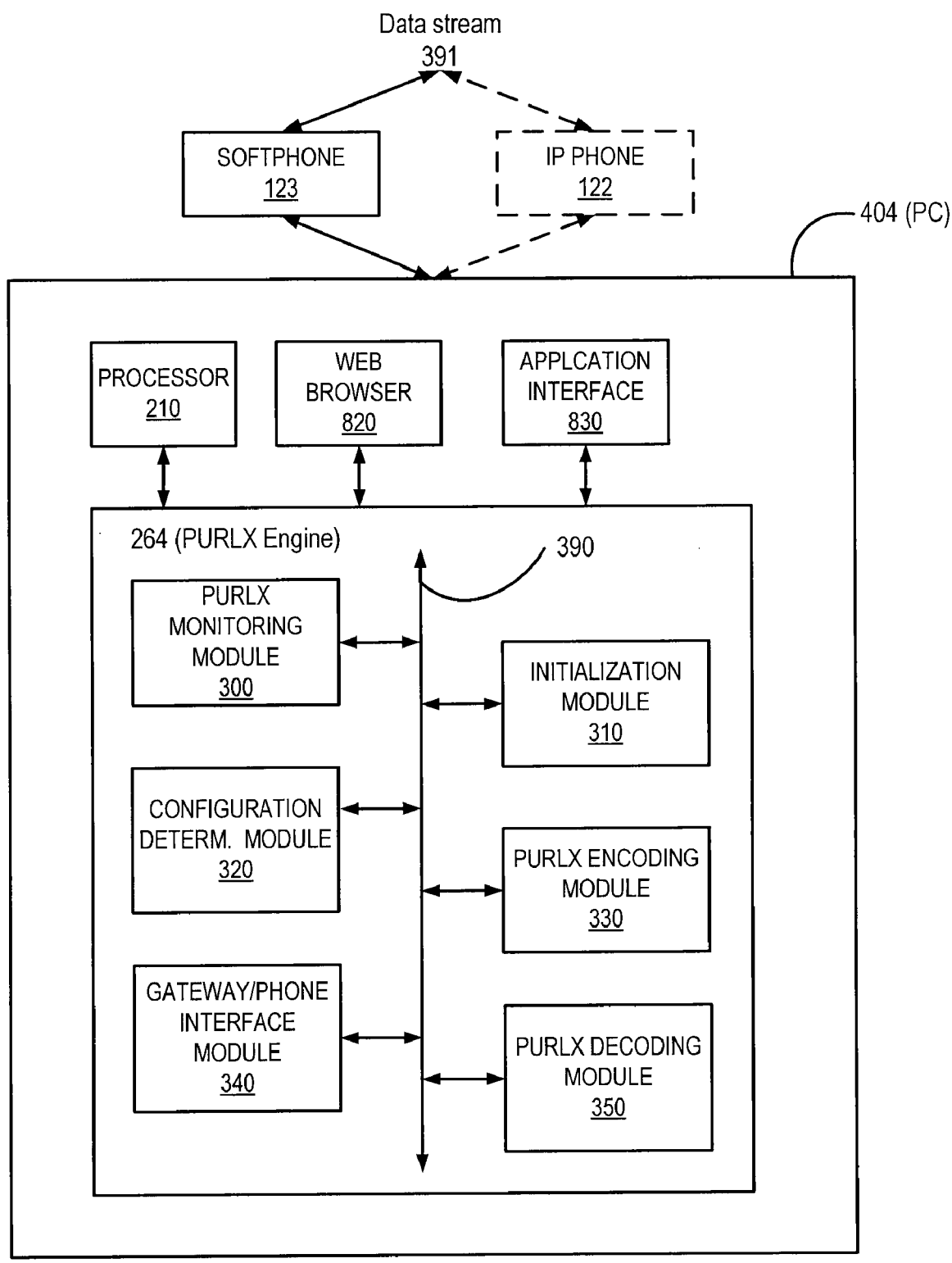
FIG. 10 is a functional block diagram showing an example of a computer having a PURLX engine according to one embodiment of the invention.

FIG. 10 is a functional block diagram showing an example of a computer (e.g., a PC 404) having a PURLX engine 264 according to one embodiment of the invention. The PC is communicatively coupled to a softphone 123 (in solid line) or an IP phone 122 (in dashed line), which sends and receives a plurality of data streams 391. The PC 404 comprises a processor 210, a web browser 820, an application interface 830 and an embodiment of the PURLX engine 264. The processor 210 can be a conventional processing device, such as a general-purpose microprocessor. The web browser 820 can be a conventional web browsing application. The application interface 830 interfaces with the softphone 123 or IP phone 122 and the PC 404. The application interface 830 triggers the sending URL embedded in audio data or communications control signals to the softphone 123 or the IP phone 122, and passes the received data stream 391 to the PURLX engine 264 for further processing. The application interface 830 also uses the web browser 820 to open the URL decoded by the PURLX engine 264.

The PURLX engine 264 in FIG. 10 comprises a PURLX monitoring module 300, an initialization module 310, a configuration determination module 320, a PURLX encoding module 330, a PURLX gateway/phone interface module 340 and a PURLX decoding module 350. Comparing with the PURLX engine 260 of the PURLX unit 110 described in conjunction with FIG. 2 and FIG. 3, the embodiment of the PURLX engine 264 illustrated in FIG. 10 does not have one component (i.e., interface module 360). In one embodiment, the functionality of the interface module 360 is performed by the application interface 830. These modules/components cooperate together to provide the same functionality of the invention as that described above with reference to FIGS. 3-4. Having the PURLX engine 264 inside the PC 404 enables a telephone such as an IP phone 122, a softphone 123 or a smart phone 124 connected with the PC 404, to detect a phone URL exchange signal, initiate the phone URL exchange operations, determine information to be sent and URL encoding method and to encode the URL to be exchanged. Upon receiving an embedded audio data, the PC 404 is able to decode the embedded audio data or the communications control signals, communicate with a web server, launch a web browser and connect to the decoded URL for web-based communications with the URL sender. In another embodiment, the PC 404 can have a PURLX engine 264 that is same as the PURLX engine 260 in FIG. 3 that includes the modules 300, 310, 320, 330, 340, 350, and 360. The operation of these modules 300, 310, 320, 330, 340, 350 and 360 can also be better understood with reference to FIGS. 3 and 4 above.

Figure 11:
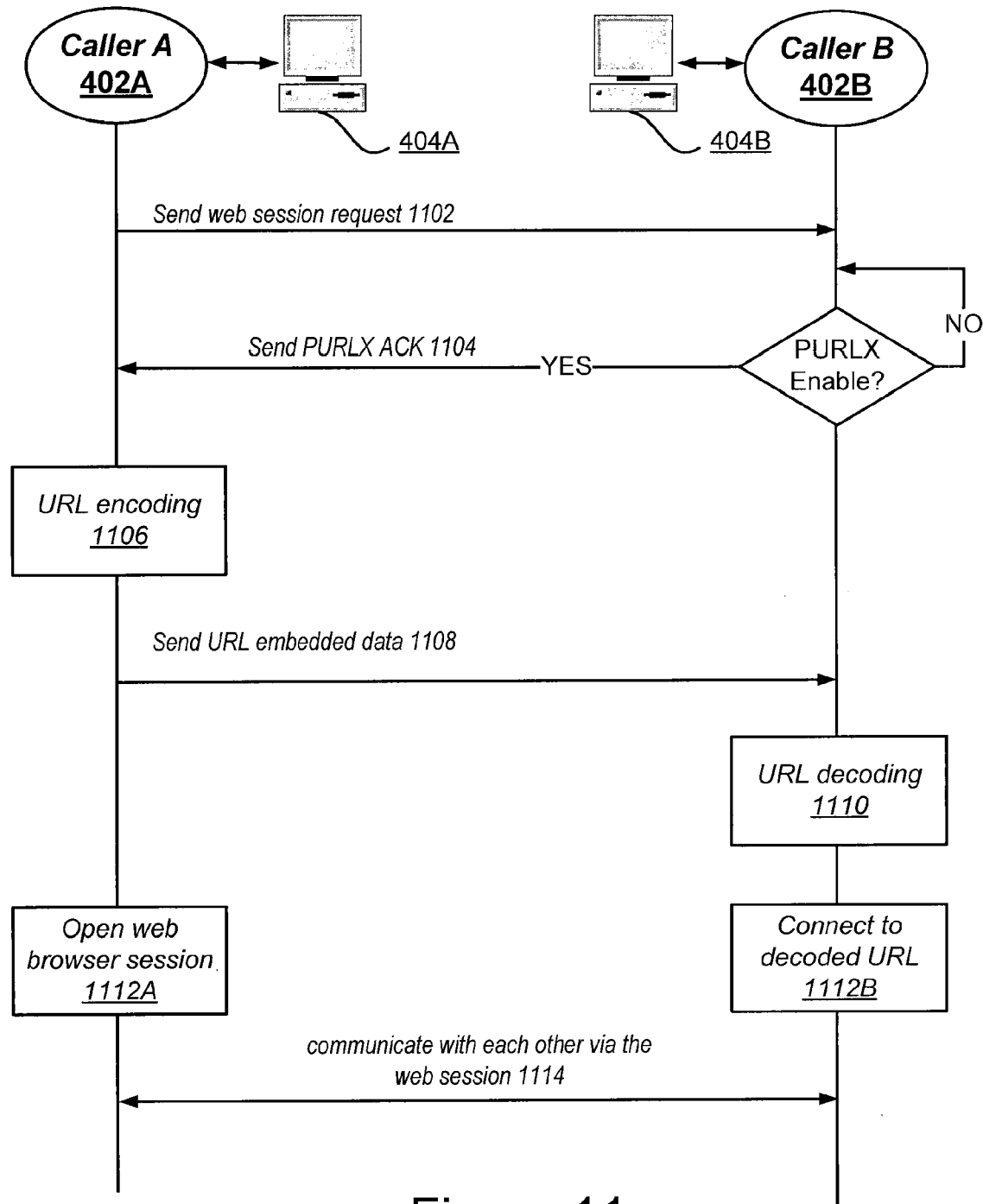
FIG. 11 is a flow chart illustrating an example of phone URL exchange using the PURLX engine illustrated in FIG. 10 according to one embodiment of the invention.

FIG. 11 is a flow chart illustrating an example of URL exchange using the PURLX engine 264 illustrated in FIG. 10 according to one embodiment of the invention. Caller 402A has an IP phone coupled to a PC 404A and caller 402B has an IP phone coupled to a PC 404B. PC 404A-B implement the PURLX engine 264 illustrated in FIG. 10. Initially, caller 402A sends 1102 a web session request to caller 402B. Caller 402B checks whether his/her phone is capable of exchanging URLs over a telephone line. Responsive to his/her phone incapable of phone URL exchange, caller 402B does not join the web session. Responsive to his/her phone capable of phone URL exchange, caller 402B sends back 1104 a PURLX acknowledgement to caller 402A. Caller 402A uses his/her PC 404A to determine the URL to be exchanged and to encode 1106 the URL into audio data or as a part of the communications control signals. Caller 402A sends 1108 the embedded data (e.g., audio data or the communications control signals) to caller 402B. Upon receiving the embedded data, caller 402B uses his/her PC 404B to decode 1110 the embedded data and connect 1112B to the decoded URL for web-based communications with caller 902A. Caller 402A also opens 1112A a web browser session at the URL exchanged. Caller 402A and caller 402B communicate 1114 with each via the web browser session at the URL exchanged.

Those skilled in the art will recognize that the example of FIGS. 5, 9 and 11 represent some of a variety of alternate embodiments. FIG. 5 represents a flow chart of two endpoints (e.g., caller 402A and caller 402B) exchanging a URL over a telephone communications channel through two PURLX units 110 (i.e., PURLX unit 110A and PURLX unit 10B) separate from the two endpoints. FIG. 9 represents a flow chart of two endpoints (e.g., caller 402A and caller 402B) exchanging a data such as URL over a telephone communications channel, where each endpoint implements a PURLX engine within the endpoint itself. FIG. 11 represents a flow chart of two endpoints (e.g., caller 402A and caller 402B) exchanging a URL over a telephone communications channel in conjunction with a computer which implements a PURLX engine. Other embodiments may include an endpoint connected with a computer as illustrated in FIG. 11 exchanges a URL over a telephone communications channel with an endpoint as illustrated in FIG. 9, or vice versa.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims of this application. As will be understood by those familiar with the art, the invention may be embodied in other specific forms without departing from the spirit or essential characteristics thereof. Likewise, the particular naming and division of the modules, routines, features, attributes, methodologies and other aspects are not mandatory or significant, and the mechanisms that implement the invention or its features may have different names, divisions and/or formats. Furthermore, as will be apparent to one of ordinary skill in the relevant art, the modules, routines, features, attributes, methodologies and other aspects of the invention can be implemented as software, hardware, firmware or any combination of the three. Also, wherever a component, an example of which is a module, of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the invention is in no way limited to implementation in any specific programming language, or for any specific operating system or environment. Accordingly, the disclosure of the invention is intended to be illustrative, but not limiting, of the scope of the invention, which is set forth in the following claims.

What is claimed is:

1. A computer method for sending a Universal Resource Identifier (URI) by a first system to a second system over a communications channel, the method comprising:
   receiving a phone URI exchange request from the first system;
   receiving an audio data from the first system;
   determining the URI to be sent and URI encoding method from a plurality of URI encoding methods based on the phone URI exchange request;
   encoding the URI using the determined encoding method; and
   sending the audio data and the encoded URI to the second system over the communications channel.

2. The method of claim 1, wherein the URI is encoded into the audio data using the determined encoding method.

3. The method of claim 2, wherein the URI encoding method describes a methodology to encode the determined URI and a signaling scheme for sending the determined URI.

4. The method of claim 3, wherein the encoding method is an ASCII Binary encoding method, wherein the determined URI is converted from ASCII format to Binary Coded Decimal format, and the converted URI is part of the audio data.

5. The method of claim 3, wherein the signaling scheme is one of Multi-Frequency Tone (MF) and Dual-Tone, Multi-Frequency (DTMF).

6. The method of claim 3, wherein the signaling scheme is one of Caller ID while Call Waiting and Analog Display Signaling Interface (ADSI).

7. The method of claim 3, wherein the encoding method is a steganography method, wherein the determined URI is transformed and hidden in the audio data.

8. The method of claim 3, wherein the encoding method encodes the determined URI into one more modem signals, and the modem signals are part of the audio data.

9. The method of claim 3, wherein the encoding method encodes the determined URI into an in-band signaling within the audio data.

10. The method of claim 3, wherein the encoding method encodes the determined URI into a white noise, and the white noise is a part of the audio data.

11. The method of claim 1, wherein the URI is encoded as a part of the communications control signals using the determined encoding method.

12. The method of claim 11, wherein the encoding method encodes the determined URI into an Integrated Services Digital Network (ISDN) signal, and the ISDN signal is sent to the second system over the communications channel.

13. The method of claim 11, wherein the encoding method encodes the determined URI into a Session Initiation Protocol (SIP) signal, and the SIP signal is sent to the second system over the communications channel.

14. The method of claim 1, wherein the URI to be sent is determined based on a pre-defined configuration.

15. The method of claim 1, wherein the URI to be sent is determined in real-time responsive to the received phone URI exchange request.

16. The method of claim 1, further comprising validating a sender, a receiver or both a sender and a receiver of the phone URI exchange request against a whitelist or a blacklist.

17. The method of claim 16, wherein the sender or the receiver of the phone URI exchange request is an automated attendant.

18. The method of claim 1, wherein the communications channel is a telephone communications channel.

19. A computer method for decoding a Universal Resource Identifier (URI) embedded in an audio data, the method comprising:
   receiving the audio data from a first system;
   determining whether a URI is embedded in the received audio data; and
   responsive to a URI being embedded in the received audio data:
      identifying URI encoding method from a plurality of URI encoding methods
      based on the received audio data; and
      decoding the audio data using a URI decoding method, the URI decoding method corresponding to the identified URI encoding method.

20. An apparatus for sending a Universal Resource Identifier (URI) over a communications channel, the apparatus comprising:
   a monitoring module configured to receive a phone URI exchange request and an audio data from a first endpoint;
   a gateway/phone interface module configured to determine the URI to be sent based on the phone URI exchange request, the gateway/phone interface module communicatively coupled with the monitoring module;
   a configuration determination module configured to determine URI encoding method from a plurality of URI encoding methods based on the phone URI exchange request, the configuration determination module communicatively coupled with the monitoring module;
   a phone URI encoding module configured to encode the URI using the determined encoding method, the phone URI encoding module communicatively coupled with the gateway/phone interface module and with the configuration determination module; and
   an interface module configured to send the audio data to a second endpoint over the communications channel, the interface module communicatively coupled with the phone URI encoding module.

21. The apparatus of claim 20, wherein the URI is encoded into the audio data using the determined encoding method.

22. The apparatus of claim 21, wherein the encoding method describes a methodology to encode the determined URI and a signaling scheme for sending the determined URI.

23. The apparatus of claim 22, wherein the encoding method is an ASCII Binary encoding method, wherein the phone URI exchange unit is configured to convert the determined URI from ASCII format to Binary Coded Decimal format, and the converted URI is part of the audio data.

24. The apparatus of claim 22, wherein the signaling scheme is one of Multi-Frequency Tone (MF) and Dual-Tone, Multi-Frequency (DTMF).

25. The apparatus of claim 22, wherein the signaling scheme is one of Caller ID while Call Waiting and Analog Display Signaling Interface (ADSI).

26. The apparatus of claim 22, wherein the encoding method is a steganography method, wherein the phone URI exchange unit is configured to transform the determined URI and hide the determined URI in the audio data.

27. The apparatus of claim 22, wherein the phone URI encoding module is configured to encode the determined URI into one or more modem signals, and the modem signals are part of the audio data.

28. The apparatus of claim 22, wherein the phone URI encoding module is configured to encode the determined URI into an in-band signaling within the audio data.

29. The apparatus of claim 22, wherein the phone URI encoding module is configured to encode the determined URI into a white noise, and the white noise is a part of the audio data.

30. The apparatus of claim 20, wherein the URI is encoded as a part of the communications control signals using the determined encoding method.

31. The apparatus of claim 30, wherein the phone URI exchange unit is configured to encode the determined URI into an Integrated Services Digital Network (ISDN) signal, and the ISDN signal is sent to the second system over the communications channel.

32. The apparatus of claim 30, wherein the phone URI encoding module is configured to encode the determined URI into a Session Initiation Protocol (SIP) signal, and the SIP signal is sent to the second system over the communications channel.

33. The apparatus of claim 20, further comprising an initialization module configured to validate a sender or a receiver or both a sender and a receiver of the phone URI exchange request against a whitelist or a blacklist.

34. The apparatus of claim 20, wherein the apparatus is one of a group of a phone, a gateway, and a computer server.

35. The apparatus of claim 20, wherein the communications channel is a telephone communications channel.

36. An apparatus for decoding a Universal Resource Identifier (URI) embedded in an audio data, the apparatus comprising:
    a monitoring module configured to receive the audio data from a first endpoint;
    a gateway/phone interface module configured to determine whether a URI is embedded in the received audio data, the gateway/phone interface module communicatively coupled with the monitoring module; and
    a phone URI decoding module configured to, the phone URI decoding module communicatively coupled with the gateway/phone interface module, responsive to a URI being embedded in the received audio data:
        identify URI encoding method from a plurality of URI encoding methods based on the received audio data; and
        decode the audio data using a URI decoding method, the URI decoding method corresponding to the identified URI encoding method.

37. A computer method for decoding a Universal Resource Identifier (URI) embedded in communications control signals, the method comprising:
    receiving the communications control signals from a first system;
    determining whether a URI is embedded in the received communications control signals; and
    responsive to a URI being embedded in the received communications control signals:
        identifying URI encoding method from a plurality of URI encoding methods based on the received communications control signals; and
        decoding the communications control signals using a URI decoding method, the URI decoding method corresponding to the identified URI encoding method.

38. An apparatus for decoding a Universal Resource Identifier (URI) embedded in communications control signals, the apparatus comprising:
    a monitoring module configured to receive the communications control signals from a first endpoint;
    a gateway/phone interface module configured to determine whether a URI is embedded in the received communications control signals, the gateway/phone interface module communicatively coupled with the monitoring module; and
    a phone URI decoding module configured to, the phone URI decoding module communicatively coupled with the gateway/phone interface module, responsive to a URI being embedded in the received audio data:
        identify URI encoding method from a plurality of URI encoding methods based on the received communications control signals; and
        decode the communications control signals using a URI decoding method, the URI decoding method corresponding to the identified URI encoding method.

* * * * *